(12) United States Patent
Kumar et al.

(10) Patent No.: US 9,378,466 B2
(45) Date of Patent: Jun. 28, 2016

(54) DATA REDUCTION IN NEAREST NEIGHBOR CLASSIFICATION

(71) Applicant: Google Inc., Mountain View, CA (US)

(72) Inventors: Sanjiv Kumar, White Plains, NY (US); Henry Allan Rowley, Sunnyvale, CA (US); Francisco Jose Claude Faust, Santiago (CL)

(73) Assignee: Google Inc., Mountain View, CA (US)

( * ) Notice: Subject to any disclaimer, the term of this patent is extended or adjusted under 35 U.S.C. 154(b) by 242 days.

(21) Appl. No.: 14/145,519

(22) Filed: Dec. 31, 2013

(65) Prior Publication Data

US 2015/0186797 A1 Jul. 2, 2015

(51) Int. Cl.
*G06N 99/00* (2010.01)

(52) U.S. Cl.
CPC .................................. *G06N 99/005* (2013.01)

(58) Field of Classification Search
CPC ... G06N 99/00; G06N 99/005; G06K 9/6218; G06K 9/6219; G06K 9/6256; G06K 9/6276; G06K 9/6287
USPC ................................................ 706/12, 20, 25
See application file for complete search history.

(56) References Cited

U.S. PATENT DOCUMENTS

| | | | | |
|---|---|---|---|---|
| 2006/0112042 A1* | 5/2006 | Platt | ..................... | G06K 9/6276 706/20 |
| 2007/0260566 A1* | 11/2007 | Urmanov | ............. | G06K 9/6287 706/25 |
| 2010/0106713 A1* | 4/2010 | Esuli | .................... | G06K 9/6276 707/716 |
| 2011/0145238 A1* | 6/2011 | Stork | ................... | G06K 9/6219 707/737 |

OTHER PUBLICATIONS

Morring B. et al., "Weighted Instance Typicality Search (WITS): A nearest neighbor data reduction algorithm", Intelligent Data Analysis, 8, 2004, pp. 61-78.*
Fayed H. et al., "A Novel Template Reduction Approach for the K-Nearest Neighbor Method", IEEE Transactions on Neural Networks, vol. 20, No. 5, May 2009.*
Sutton O. "Introduction to k Nearest Neighbour Classication and Condensed Nearest Neighbour Data Reduction", Feb. 2012, pp. 1-10.*
Jadbabaie et al., "Coordination of Groups of Mobile Autonomous Agents Using Nearest Neighbor Rules," IEEE Transactions on Automatic Control, Jun. 2003, 988-1001.
Arya et al., "An Optimal Algorithm for Approximate Nearest Neighbor Searching in Fixed Dimensions," Journal of the ACM, 45(6):891-923, Nov. 1998.

(Continued)

*Primary Examiner* — Stanley K Hill
*Assistant Examiner* — Dave Misir
(74) *Attorney, Agent, or Firm* — Fish & Richardson P.C.

(57) ABSTRACT

A set S is initialized. Initially, S is empty; but, as the disclosed process is performed, items are added to it. It may contain one or more samples (e.g., items) from each class. One or more labeled samples for one or more classes may be obtained. A series of operations may be performed, iteratively, until a stopping criterion is reach to obtain the reduced set. For each class of the one or more classes, a point may be generated based on at least one sample in the class having a nearest neighbor in a set S with a different class label than the sample. The point may be added to the set S. The process may be repeated unless a stopping criterion is reached. A nearest neighbor for a submitted point in the set S may be identified and a candidate nearest neighbor may be output for the submitted point.

25 Claims, 6 Drawing Sheets

(56) References Cited

OTHER PUBLICATIONS

Indyk and Motwani, "Approximate Nearest Neighbors: Towards Removing the Curse of Dimensionality," STOC '98 Proceedings of the thirtieth annual ACM symposium on Theory of computing, 604-613, Apr. 4, 1998.

Yianilos, "Data Structures and Algorithms for Nearest Neighbor Search in General Metric Spaces," SODA '93 Proceedings of the fourth annual ACM-SIAM Symposium on Discrete algorithms, 311-321, 1993.

Weinberger and Saul, "Distance Metric Learning for Large Margin Nearest Neighbor Classification," The Journal of Machine Learning Research, vol. 10, 207-244, Dec. 2009.

Roussopoulos et al., "Nearest Neighbor Queries," SIGMOD '95 Proceedings of the 1995 ACM SIGMOD international conference on Management of data, 71-79, May 1995.

\* cited by examiner

DATA REDUCTION IN NEAREST NEIGHBOR CLASSIFICATION

BACKGROUND

A nearest neighbor technique such as k-nearest neighbor ("KNN") is a machine learning method used to assign class membership to objects or data. For example, computer-based handwriting recognition attempts to recognize a character written by classifying the written character to one that is nearest to a stored representation of characters that make up the entire alphabet and/or numerical representations for a language. In some cases, the alphabet may contain thousands of characters such as those for Chinese or Japanese languages. A database for the alphabet may contain a handwritten sample for each character. When presented with a handwritten character by a user, the computer may attempt to assign one of the character labels in the database by extracting features from the user's handwritten character and determining those samples in the database that have similar features using a nearest neighbor technique. In KNN, the k most similar samples from the database may be determined and a character label may be assigned by voting. A database may contain millions of samples; thus, performing a search in such a large database is computationally expensive. In addition, the larger the number of characters, the more storage is required.

BRIEF SUMMARY

According to an implementation of the disclosed subject matter, a reduced dataset S may be initialized. Initially, S is empty; but, as the disclosed process is performed, items are added to it. It may contain one or more samples (e.g., items) from each class. One or more labeled samples for one or more classes may be obtained. A processor may perform a series of operations at least one time. For each class of the one or more classes, a point Y may be generated based upon at least one sample in the class having a class label different than a class label of each KNNs of the at least one sample. The value of k may be greater than or equal to one. In some instances, k may be equal to one for at least one of the classes and the sample in the at least one class may have a nearest neighbor in a set with a different class label than the sample. The point Y may be generated using a variety of techniques such as computing an average, a random selection of one of the one or more samples, neighborhood propagation, a random walk, or other similar techniques known in the art. The point Y may be added to the set S as part of the series of operations. The series of operations may be performed one or more times. The series of operations may be performed until a stopping criterion is met such as until each of the one or more labeled samples is correctly labeled, until a threshold accuracy is attained, or until a storage capacity is reached. A nearest neighbor of a submitted point may be identified in the set S and the nearest neighbor may be output as a candidate for the submitted point. The submitted point may be unlabeled and may be obtained, for example, by the processor.

In an implementation, a system is provided that includes a database and a processor connected thereto. The database may store one or more labeled samples for one or more classes. The processor may perform a series of operations at least one time. The operations may include generating a point Y based upon at least one sample in the class having a class label different than a class label of each KNNs of the at least one sample. The value of k may be greater than or equal to one. In some instances, k may be equal to one for at least one of the classes and the sample in the at least one class may have a nearest neighbor in a set with a different class label than the sample. The processor may be configured to add the point Y to the set S for each class of the one or more of classes. The processor may be configured to identify a nearest neighbor of a submitted point in the set S and output the nearest neighbor as a candidate for the submitted point.

As disclosed herein, the information contained in a database for a nearest neighbor search may be reduced without sacrificing accuracy in classifying objects or data contained therein. This may result in faster classification as well. Additional features, advantages, and implementations of the disclosed subject matter may be set forth or apparent from consideration of the following detailed description, drawings, and claims. Moreover, it is to be understood that both the foregoing summary and the following detailed description provide examples of implementations and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

One way of reducing the computational resources required for operations such as character and/or handwriting analysis is to reduce the size of the stored database to be used to assign one or more class labels on a given character. Implementations of the subject matter disclosed herein may provide techniques and systems to generate such a reduced database.

Figure 3:
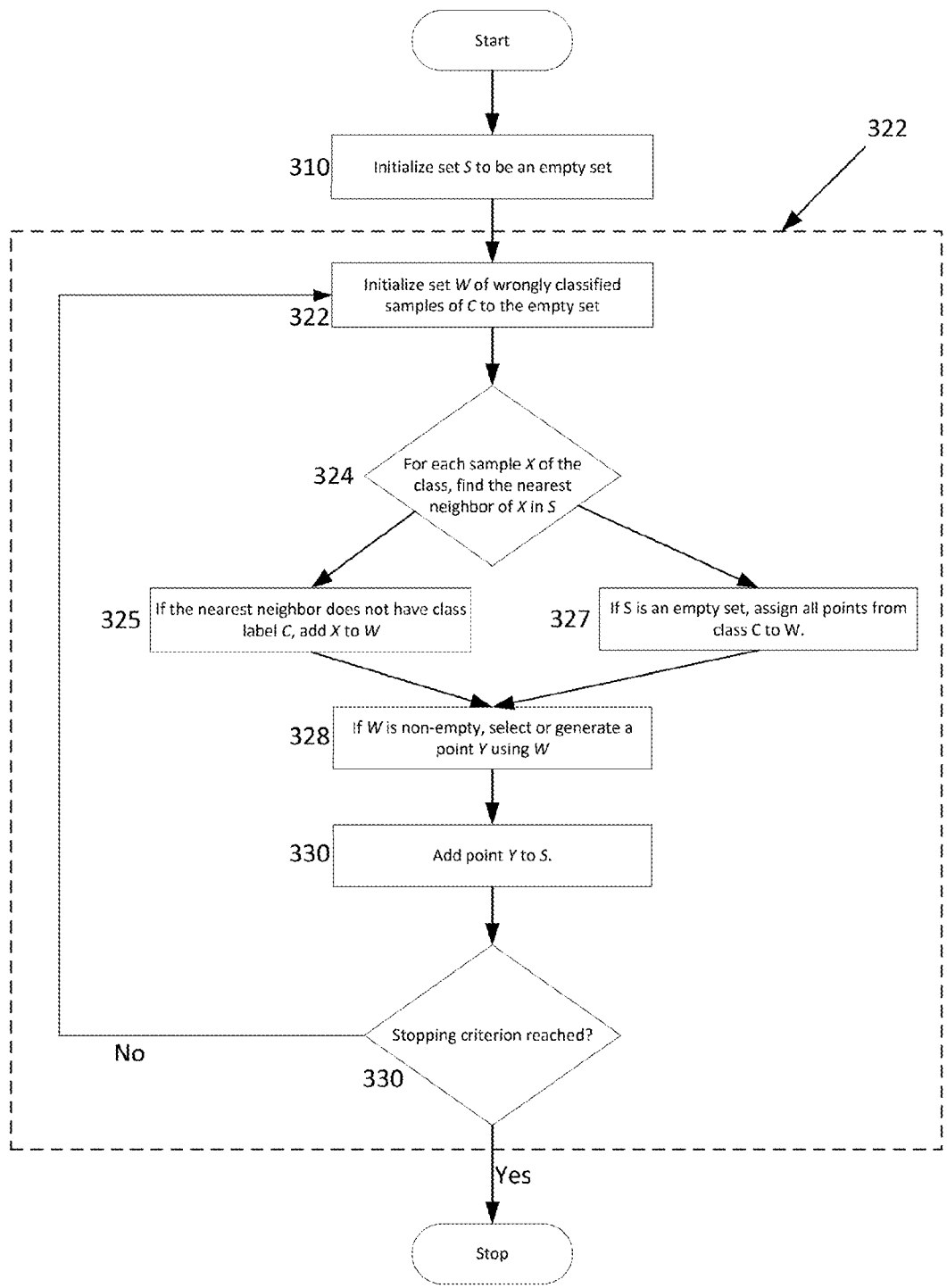
FIG. 3 is an example process for obtaining a reduced set of on which a nearest neighbor search may be performed as disclosed herein.

Implementations disclosed herein may reduce a dataset. An example of the process is provided in FIG. 3. To generate a reduced set in which a nearest neighbor search may be performed, an empty set, S, may be initialized at 310. As disclosed, new points may be added to the empty set until the classification error computed with this set of points becomes acceptable (e.g., satisfies one or more stopping criteria as described below). For each class, C, a series of steps may be performed at 320. In the first step, a set, W, of wrongly classified samples of C may be initialized to the empty set at 322. A wrongly classified sample may refer to a sample whose nearest neighbor belongs to a class other than the one for which the sample actually belongs and/or if the correct label of a sample does not appear in the classes represented by the top KNN.

In the second step, for each sample, X, of the class, the nearest neighbor of X may be determined in S at 324. If the nearest neighbor does not have a class label, C, the sample, X may be added to set, W at 325. If S is an empty set, all of the points from class C may be assigned to W at 327. The points that are added to set W may include points that are correctly classified but with a small margin (e.g., points for which there is not a high confidence). The margin may be defined in a variety of ways. For example, the distance of a sample X from class C may have a distance to its nearest neighbor from set S as $D_S$. The distance of X from its nearest neighbor from those points in S that are from the same class C may be $D_C$. Differences, represented by $D_S-D_C$, can be used to define the margin. If this difference is less than a specified positive threshold (e.g., a threshold value), T, those points may be added to the set W as well. This computation of margin may be extended to KNN classification in some configurations. When using a KNN classification, the difference between the number of points from the correct class and the number of points from the incorrect classes out of k nearest neighbors of point X from set S is determined. If this difference is less than a specified number, these points may be added to W. In situations where KNN is used to find a short-list of k candidates, the margin may be computed as the distance from point X to its kth nearest neighbor from all points in S that do not belong to class C (represented by $D_C^*$). The margin may be computed as $D_C^*-D_C$. More generally, when a KNN technique is used, points with a correct or incorrect class are selected from among k nearest neighbors, where k is a parameter which may be controllable by a user of the system. Thus, in the example above, the parameter k may be established upon configuration of the system by a user.

In a third step, if W is non-empty, a point Y may be selected or generated using W at 328 and added to S at 330. The points that are iteratively added to the set S in the third step may or may not be the points from the original set of samples X. The three steps may be repeated until a stopping criterion is reached at 330.

Figure 4A:
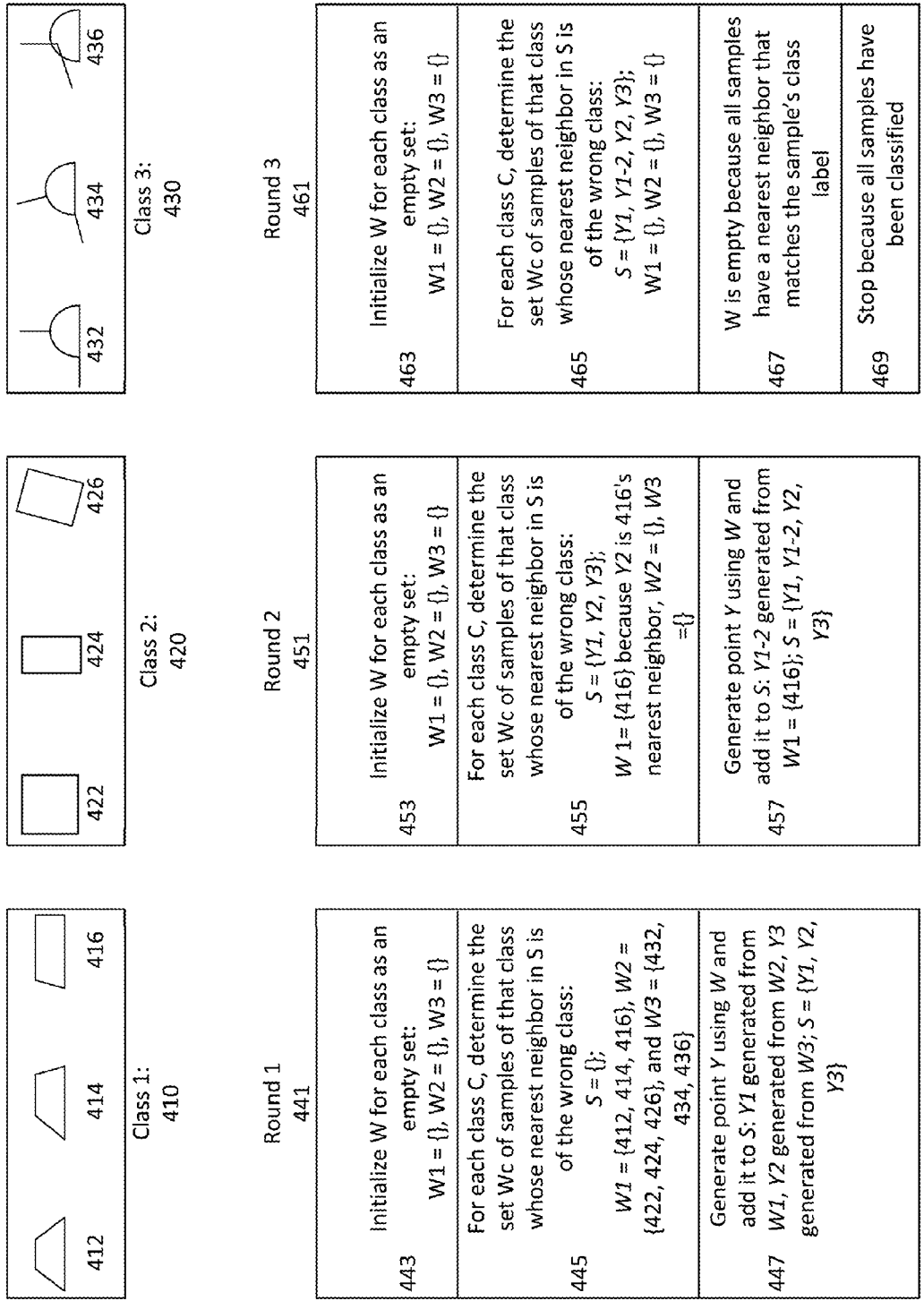
FIG. 4A is an example process of classifying labeled samples to generate a reduced set according to an implementation.

An example of the process, repeated three times, is provided in FIG. 4A. Three classes of characters are shown 410, 420, and 430. Classes 1, 2, and 3 may represent trapezoids 410, squares 420, and modified semicircles 430 respectively. Each of the drawings shown may represent a sample 412, 414, 416, 422, 424, 426, 432, 434, and 436 for one of the classes. Thus, each sample has been labeled with a class (e.g., Class 1 410 for the three trapezoid characters shown 412, 414, and 416). The process may begin by initializing set S to an empty set (i.e., a set containing no elements). For example, a computer processor may clear a buffer for the set S of any elements defined thereto. As another example, the processor may define set S as an empty set.

The system is now prepared to iteratively add new points until the classification error computed with the set of points becomes reasonable. In FIG. 4A, an empty set may be initialized for each of the classes, resulting in W1, W2, and W3 as shown at 443. For each class C (e.g., Classes 1 410, 2 420, and 3 430 as shown in FIG. 4A), a set $W_C$ of samples of that class whose nearest neighbor in S is of the wrong class may be determined 445. In Round 1 441, each sample has no nearest neighbor because the set S is empty. Because the set S is empty, all of the members of each class are assigned to the respective set W. For example, members of Class 1 410 will be assigned to W1 and members of Class 2 420 will be assigned to W2.

A point Y may be generated using W and added to S at 447. For example, the point Y may be generated by taking an average of all of the members of W. In the case of Class 2 420, which represents squares, Y2 may represent a composite version of a square based on an average or mean of the members of Class 2 420, each of which is in W2 in Round 1 441. In some configurations, the point Y may be generated by randomly selecting one of the members of W2 such as 422.

In some configurations, a graph may be generated for the items contained in a set W that contains samples of a class having a nearest neighbor with an incorrect class label as previously described. For example, every "item" may be represented by a vector of numbers, termed features. For example, if W contains handwriting characters, the graph may be an image of a character of a fixed resolution, such as 8×8 pixels in size. An example feature vector for such an item may be a vector containing these 8×8=256 pixel intensities. To make a graph of items, a "nearest neighbor graph" may be constructed, where each item is a node in the graph. Each item may be connected to its N nearest neighbors, where nearness is determined by, for example, the Euclidean distance between the corresponding feature vectors. In some configurations, each item may be connected to all the items in W that are within a specified distance from it.

A sample that represents the items in the graph may be determined using a technique such as a random walk through the graph or by selecting the sample that has the highest number of connections in the graph. A random walk typically settles on a high density portion of the graph. Neighborhood propagation may be applied to the graph to find the highest weight sample. Thus, a random walk may be utilized to determine the point Y. A hub of W may be determined for the random walk. A hub may refer to points that lie in high density regions of points from the set W. The nodes of the graph may represent the samples W, and weighted edges may represent the distances between the samples. A random walk may then be performed in the graph by taking edges with shorter distances with higher probability and/or using a weight propagation technique to determine the highest weighted sample. The random walk may determine the highest rank hub of wrongly labeled samples, which may be most representative in the samples and be useful when added to the database. In the example provided in FIG. 4A, the point Y represents the average of the members of W. Thus, Y1, Y2, and Y3 have been added to S and each of Y1, Y2, and Y3 has a label corresponding to the appropriate class (e.g., Y1 has a class label of trapezoid 410). Examples of a point Y for each of the classes is provided in FIG. 4B. In this example, the canonical member of each class has been selected as the representative for point Y. Thus, Y1 is represented by a trapezoid 492, Y2 is represented by a square 494, and Y3 is represented by a modified semicircle 496.

Figure 4B:
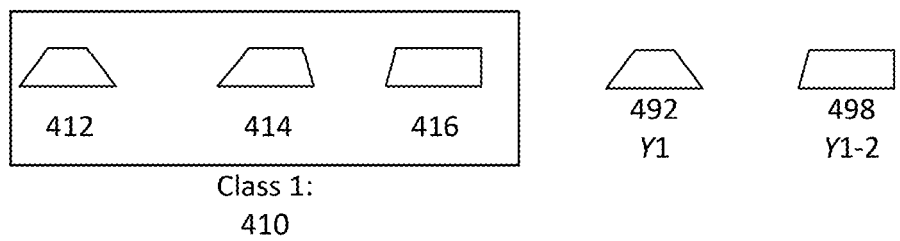
FIG. 4B shows examples of point Y.
Figure 4B:
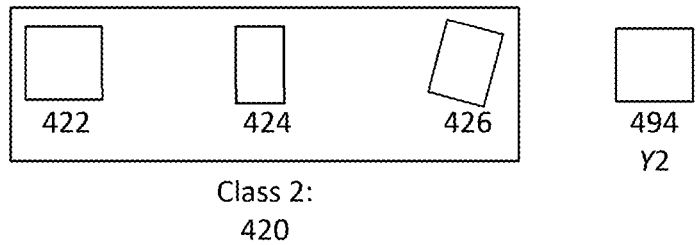
Figure 4B:
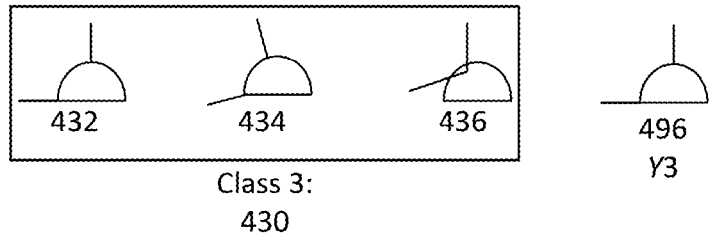

In Round 2 451, a processor may clear values set for each of W1, W2, and W3 at 453 for each sample of the three classes shown in FIG. 4A. For each class C (e.g., Classes 1 410, 2 420, and 3 430 as shown in FIG. 4A), a set $W_C$ of samples of that class whose nearest neighbor in S is of the wrong class may be determined 455. In Round 2 451, S contains Y1, Y2, and Y3. In this example, one of the trapezoid samples 416 may have as a nearest neighbor the point, Y2, that was generated from the square class 420. For that sample, the class label of the sample will not match the class label of its nearest neighbor. That is, it may be a sample of a class whose nearest neighbor in S is of the wrong class. All other samples in the trapezoid class 410 and the other two classes 420, 430 will be a nearest neighbor to Y1, Y2, and Y3 respectively that will match the label for the sample. Thus, only 416 will be added to W1. A point Y1-2 may be generated for 416 and added to S. An example of Y1-2 is shown in FIG. 4B. S will, therefore, include Y1, Y1-2, Y2, and Y3 at the end of Round 2 451. The class label for Y1-2 will be trapezoid or that of Class 1 410.

In Round 3 461, as shown in FIG. 4A, values set for each of W1, W2, and W3 may be cleared (e.g., a buffer may be erased or values assigned to W1, W2, and W3 may be cleared or set to 0) 463. For each class C (e.g., Classes 1 410, 2 420, and 3 430 as shown in FIG. 4A), a set $W_C$ of samples of that class whose nearest neighbor in S is of the wrong class may be determined 465. S contains Y1, Y1-2, Y2, and Y3 in Round 3 461. The nearest neighbor of X in S may be determined. 412 and 414 may be nearest to Y1. 416 may be nearest to Y1-2. 422, 424, and 426 may be nearest to Y2 and 432, 434, and 436 may be nearest to Y3. The nearest neighbor for each sample X matches the class label of sample X. Notably, the previously wrongly classified sample of Class 1 416 is assigned to Y1-2. The set S may contain representations for each of the classes 410, 420, 430; that is, it may be able to correctly classify characters. In practice, this may be utilized for handwriting recognition, for example.

At the end of Round 3 461, each W for each of the corresponding three classes is empty 467. All of the sets W being empty may be a stopping criterion (e.g., all of the training samples are classified correctly) 469. Other stopping criterion may be utilized to terminate the iteration of the series of operations. Another stopping criterion may be performing the series of operations until a threshold accuracy is attained. For example, the selected set S may be utilized to classify a test set of characters in a validation step. Iteration of the series of operations may be ceased once the accuracy ceases to improve or reaches a threshold (e.g., desired) level of accuracy. A stopping criterion may be a storage capacity limit. For example, on a mobile device it may be desirable to maintain only a few samples for each class to reduce the storage size of S on the device or in a database.

Figure 5:
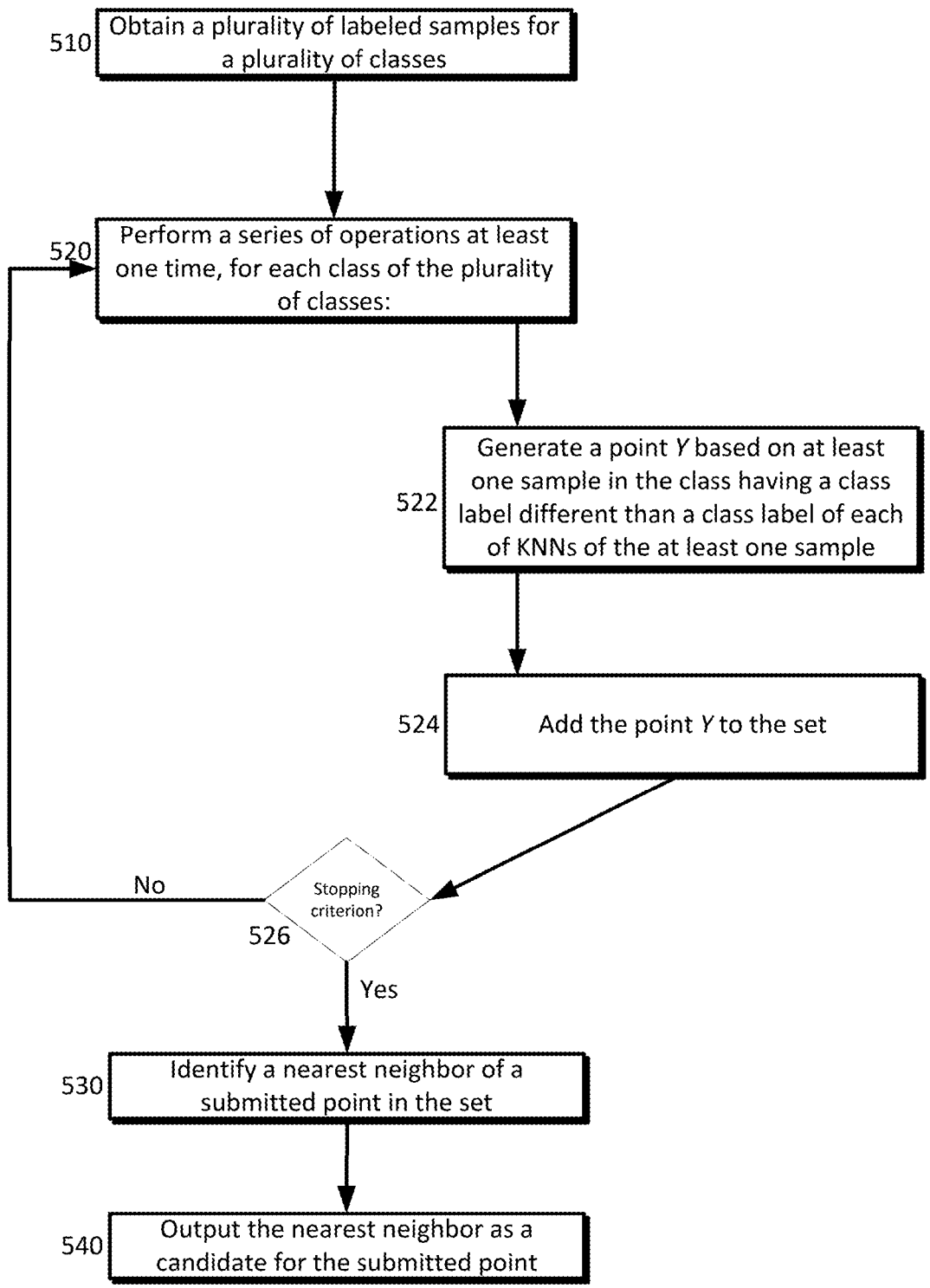
FIG. 5 is an example method for outputting a candidate for a submitted point as disclosed herein.

In an implementation, an example of which is provided in FIG. 5, one or more labeled samples for one or more classes may be obtained at 510. The labeled samples, for example, may be obtained from a manual review of handwriting samples. An empty set S may be initialized as described earlier. A series of operations may be performed one or more times at 520. The operations may include generating a point Y based upon the at least one sample in the class having a class label different than a class label of each KNNs of the at least one sample at 522. The value of k may be greater than or equal to one. In some instances, k may be equal to one for at least one of the classes and the sample in the at least one class may have a nearest neighbor in a set with a different class label than the sample. The point Y may be added to the set S at 524. A nearest neighbor of a submitted point in the set S may be identified at 530. The series of operations may cease once a stopping criterion 526 is reached as described earlier. The submitted point may be unlabeled. For example, it may be obtained from a user-entered or submitted handwritten character. The nearest neighbor may be output as a candidate for the submitted point at 540. For example, the unlabeled submitted point may have a nearest neighbor in set S. The submitted point may be labeled as a member of the class of its nearest neighbor in set S.

Figure 6:
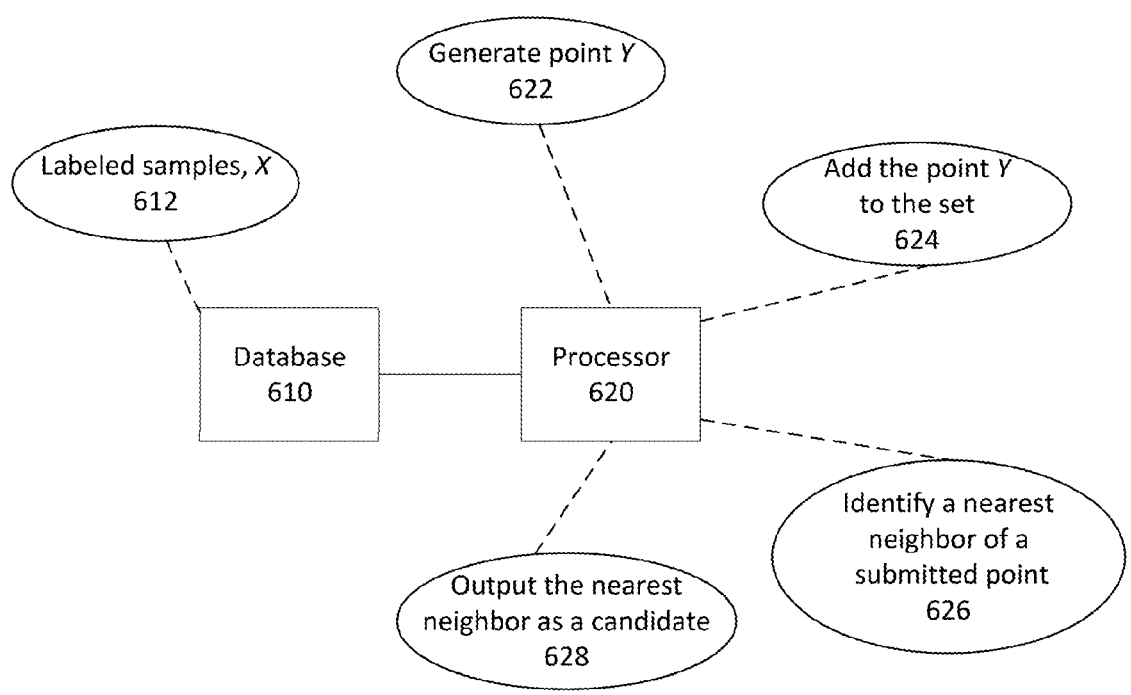
FIG. 6 is an example system that may be used to determine a reduced set and output a candidate for a submitted point as disclosed herein.

In an implementation, an example of which is provide in FIG. 6, a system is provided that includes a database 610 for storing one or more labeled samples 612 for one or more classes. The system may include a processor 620 connected to the database 610. The processor may be configured to select and initialize an empty set, S, as described earlier. The processor 620 may perform a series of operations at least one time. The operations may include, for each class of the one or more classes, generating a point Y 622. The point Y may be based on at least one sample in the class having a class label different than a class label of each KNNs of the at least one sample. as described above (e.g., wrongly classified samples of C). The value of k may be greater than or equal to one. In some instances, k may be equal to one for at least one of the classes and the sample in the at least one class may have a nearest neighbor in a set with a different class label than the sample. The processor 620 may be configured to add the point Y to the set S 624. The process may stop if a stopping criterion is reached. The processor 620 may be configured to identify a nearest neighbor of a submitted point (e.g., the KNN) in the set S 626 and output the nearest neighbor as a candidate for the submitted point 628 as described earlier.

Figure 1:
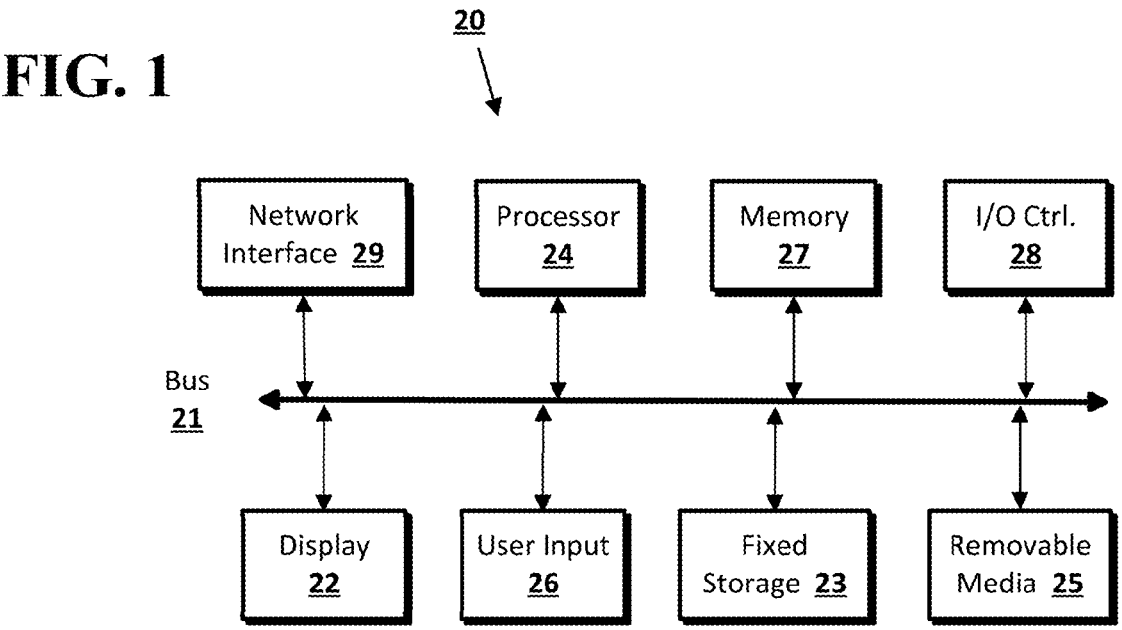
FIG. 1 shows a computer according to an implementation of the disclosed subject matter.

Implementations of the presently disclosed subject matter may be implemented in and used with a variety of component and network architectures. FIG. 1 is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
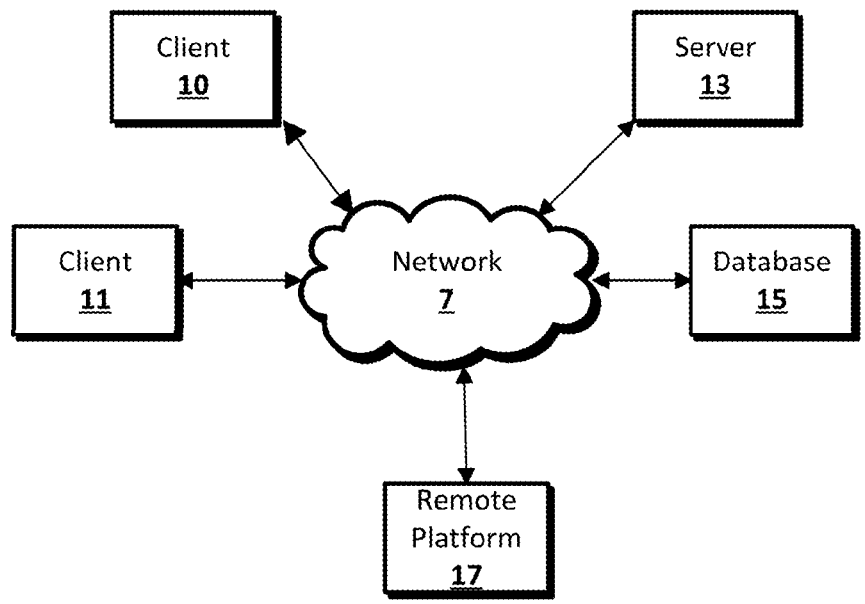
FIG. 2 shows a network configuration according to an implementation of the disclosed subject matter.

FIG. 2 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method comprising:
    receiving a training set of items X that are each labeled as belonging to a respective class c, from among a set of classes C;
    initializing a reduced dataset S as an empty set;
    for each class c of the set of classes C, initializing, as an empty set, a set Wc for identifying (i) items whose nearest neighbor belongs to a different class, when the reduced dataset S is not an empty set, or (ii) all items that are labeled as belonging to the class c, when the reduced dataset S is an empty set;
    determining that the reduced dataset S is an empty set, then, for each class c of the set of classes C:
        assigning all items of the training set X that are labeled as belonging to the class c to the set Wc,
        generating a representation Yc of the items that are assigned to the set Wc, and
        assigning the representation Yc of the items to the reduced dataset S as belonging to the class c;
    after (i) determining that the reduced dataset S is an empty set, and (ii) assigning the representations Yc of the items to the reduced dataset S, re-initializing, as an empty set, the set Wc for each class c of the set of classes C;
    determining that the reduced dataset S is not an empty set, then, for each class c of the set of classes C:
        identifying whether any items that are labeled as being members of the class have a nearest neighbor, among the representations Yc of the items in the reduced dataset S, that belongs to a different class,
        if any items are identified that are labeled as being members of the class have a nearest neighbor, among the representations of the items in the reduced dataset S, that belongs to a different class are identified, generating a representation of the identified items, and
        assigning the representation of identified items as belonging to the class c; and
    using the reduced dataset S to identify a class to which a particular item belongs.

2. The method of claim 1, wherein initializing a reduced dataset S as an empty set comprises:
    clearing a buffer for the reduced dataset S.

3. The method of claim 1, wherein initializing a reduced dataset S as an empty set comprises:
    defining the reduced dataset S as an empty set.

4. The method of claim 1, wherein generating the representation Yc of the items that are assigned to the set Wc comprises:
    designating an average of items of the set Wc as the representation Yc.

5. The method of claim 1, wherein generating the representation Yc of the items that are assigned to the set Wc comprises:
    designating a random item of the set Wc as the representation Yc.

6. The method of claim 1, wherein generating the representation Yc of the items that are assigned to the set Wc comprises:
selecting, using a random walk, an item of the set Wc as the representation Yc.

7. The method of claim 1, wherein generating the representation Yc of the items that are assigned to the set Wc comprises:
selecting, using a neighborhood propagation, an item of the set Wc as the representation Yc.

8. The method of claim 1, wherein:
the set Wc comprises a set of images,
generating the representation Yc of the items that are assigned to the set Wc comprises designating a composite of the images of the set Wc as the representation Yc.

9. The method of claim 1, wherein the items are images of handwritten characters that are represented by vectors.

10. The method of claim 1, wherein the training set of items X is labeled using a manual review of the training set of items X.

11. The method of claim 1, comprising:
for each class c of the set of classes C, determining that the set Wc is an empty set.

12. A system comprising:
one or more computers and one or more storage devices storing instructions that are operable, when executed by the one or more computers, to cause the one or more computers to perform operations comprising:
receiving a training set of items X that are each labeled as belonging to a respective class c, from among a set of classes C;
initializing a reduced dataset S as an empty set;
for each class c of the set of classes C, initializing, as an empty set, a set Wc for identifying (i) items whose nearest neighbor belongs to a different class, when the reduced dataset S is not an empty set, or (ii) all items that are labeled as belonging to the class c, when the reduced dataset S is an empty set;
determining that the reduced dataset S is an empty set, then, for each class c of the set of classes C:
assigning all items of the training set X that are labeled as belonging to the class c to the set Wc,
generating a representation Yc of the items that are assigned to the set Wc, and
assigning the representation Yc of the items to the reduced dataset S as belonging to the class c; and
using the reduced dataset S to identify a class to which a particular item belongs.

13. The system of claim 12, wherein initializing a reduced dataset S as an empty set comprises:
clearing a buffer for the reduced dataset S.

14. The system of claim 12, wherein initializing a reduced dataset S as an empty set comprises:
defining the reduced dataset S as an empty set.

15. The system of claim 12, wherein generating the representation Yc of the items that are assigned to the set Wc comprises:
designating an average of items of the set Wc as the representation Yc.

16. The system of claim 12, wherein generating the representation Yc of the items that are assigned to the set Wc comprises:
designating a random item of the set Wc as the representation Yc.

17. The system of claim 12, wherein generating the representation Yc of the items that are assigned to the set Wc comprises:
selecting, using a random walk, an item of the set Wc as the representation Yc.

18. The system of claim 12, wherein generating the representation Yc of the items that are assigned to the set Wc comprises:
selecting, using a neighborhood propagation, an item of the set Wc as the representation Yc.

19. The system of claim 12, wherein:
the set Wc comprises a set of images,
generating the representation Yc of the items that are assigned to the set Wc comprises designating a composite of the images of the set Wc as the representation Yc.

20. The system of claim 12, wherein the items are images of handwritten characters that are represented by vectors.

21. The system of claim 12, wherein the training set of items X is labeled using a manual review of the training set of items X.

22. The system of claim 12, wherein the operations further comprise:
for each class c of the set of classes C, determining that the set Wc is an empty set.

23. A non-transitory computer-readable medium storing software comprising instructions executable by one or more computers which, upon such execution, cause the one or more computers to perform operations comprising:
receiving a training set of items X that are each labeled as belonging to a respective class c, from among a set of classes C;
initializing a reduced dataset S;
determining that the reduced dataset S is not an empty set, then, for each class c of the set of classes C:
identifying whether any items that are labeled as being members of the class have a nearest neighbor, among items in the reduced dataset S, that belongs to a different class,
if any items are identified that are labeled as being members of the class have a nearest neighbor, among representations of the items in the reduced dataset S, that belongs to a different class are identified, generating a representation of the identified items, and
assigning the representation of identified items as belonging to the class c; and
using the reduced dataset S to identify a class to which a particular item belongs.

24. The medium of claim 23, wherein the items are images of handwritten characters that are represented by vectors.

25. The medium of claim 23, wherein the training set of items X is labeled using a manual review of the training set of items X.

* * * * *